(12) United States Patent
Giraud et al.

(10) Patent No.: US 10,676,070 B2
(45) Date of Patent: Jun. 9, 2020

(54) DEVICE FOR PROTECTION OF AN OPTICAL SENSOR

(71) Applicant: Valeo Systèmes d'Essuyage, Le Mesnil Saint Denis (FR)

(72) Inventors: Frédéric Giraud, Le Perray en Yvelines (FR); Marcel Trebouet, Chavenay (FR)

(73) Assignee: Valeo Systèmes d'Essuvage, Le Mesnil Saint Denis (FR)

( * ) Notice: Subject to any disclaimer, the term of this patent is extended or adjusted under 35 U.S.C. 154(b) by 108 days.

(21) Appl. No.: 15/513,686

(22) PCT Filed: Jul. 28, 2015

(86) PCT No.: PCT/EP2015/067256
§ 371 (c)(1),
(2) Date: Mar. 23, 2017

(87) PCT Pub. No.: WO2016/045828
PCT Pub. Date: Mar. 31, 2016

(65) Prior Publication Data
US 2017/0297536 A1    Oct. 19, 2017

(30) Foreign Application Priority Data

Sep. 23, 2014  (FR) .................................... 14 58968

(51) Int. Cl.
*B60S 1/56* (2006.01)
*B08B 17/02* (2006.01)
(Continued)

(52) U.S. Cl.
CPC .................. *B60S 1/56* (2013.01); *B08B 5/02* (2013.01); *B08B 17/02* (2013.01); *B60S 1/023* (2013.01); *G02B 27/0006* (2013.01); *B08B 5/00* (2013.01)

(58) Field of Classification Search
CPC .... B60S 1/56; B60S 1/60; B60S 1/603; B60S 1/62; B60S 1/64; B60S 1/66; B60S 1/0848; B08B 5/02; B08B 17/02
See application file for complete search history.

(56) References Cited

U.S. PATENT DOCUMENTS

| 4,240,691 A | * | 12/1980 | Holmqvist | ............. | G01N 21/15 |
| | | | | | 359/509 |
| 2008/0205878 A1 | * | 8/2008 | Owashi | ..................... | B08B 5/04 |
| | | | | | 396/429 |

(Continued)

FOREIGN PATENT DOCUMENTS

| DE | 10225151 A1 | 12/2003 |
| JP | H02-293236 A | 12/1990 |

(Continued)

OTHER PUBLICATIONS

International Search Report issued in PCT/EP2015/067256 dated Oct. 8, 2015 (3 pages).

(Continued)

*Primary Examiner* — Bryan R Muller
*Assistant Examiner* — Joel D Crandall
(74) *Attorney, Agent, or Firm* — Osha Liang LLP

(57) ABSTRACT

A device for protection of an optical sensor includes at least one nozzle for projection of air in front of the optical sensor, the projection nozzle being arranged on a side of the optical sensor and linked to an air discharge pump via a discharge conduit such that the air projected by the air projection nozzle is flush with the optical sensor, and at least one suction conduit arranged on the opposite side of the optical sensor to the projection nozzle. The suction conduit is linked to the discharge conduit of the pump, downstream of the pump, such that the suction in the suction conduit is achieved by a Venturi effect.

12 Claims, 4 Drawing Sheets

(51) Int. Cl.
    *B08B 5/02*     (2006.01)
    *B60S 1/02*     (2006.01)
    *G02B 27/00*     (2006.01)
    *B08B 5/00*     (2006.01)

(56) References Cited

U.S. PATENT DOCUMENTS

| | | | |
|---|---|---|---|
| 2011/0005030 A1 | 1/2011 | Shirono | |
| 2011/0073142 A1* | 3/2011 | Hattori | B60S 1/0848 134/56 R |

FOREIGN PATENT DOCUMENTS

| | | |
|---|---|---|
| JP | 2008-185787 A | 8/2008 |
| JP | 2012-132988 A | 7/2012 |
| JP | 2012-201122 A | 10/2012 |
| WO | 03/104052 A1 | 12/2003 |
| WO | 2005/039934 A2 | 5/2005 |

OTHER PUBLICATIONS

Written Opinion of the International Searching Authority issued in PCT/EP2015/067256 dated Oct. 8, 2015 (5 pages).
Notification of Reason for Rejection in corresponding Japanese Application No. 2017-515895, dated May 10, 2019 (4 pages).

\* cited by examiner

DEVICE FOR PROTECTION OF AN OPTICAL SENSOR

The present invention relates to a device for protection of an optical sensor.

Nowadays, rear view cameras equip a large number of motor vehicles and in particular form part of a parking assistance system that facilitates parking in a parking space without turning round and makes it possible to detect obstacles situated behind the vehicle.

There are known video cameras that are installed inside the passenger compartment against the rear window and looking rearwards from the rear window of the vehicle. These video cameras are well protected from external climatic influences and can for example have the benefit of systems for de-icing and cleaning the rear window, for example a heating wire integrated into the glass of the rear window.

However, the viewing angle is not the optimum, notably for assistance with parking, and for this reason it is preferable for the camera to be arranged at the level of the rear bumper or at the level of the rear number plate of the vehicle.

In this case, the camera is therefore greatly exposed to splashing with dirt that may be deposited on its optic and therefore reduce its effectiveness or even render it inoperative.

In rainy weather in particular, splashing of rain and dirt is observed that can greatly affect the operability of the vision system.

To counteract the deposition of dirt on the video camera it is known to provide a device for cleaning the optic of the video camera, generally a cleaning liquid nozzle, in the vicinity thereof, to eliminate the polluting elements that are deposited over time.

However, the optic of the camera, which is a relatively fragile element, is not protected from projections that can damage it.

It is also known to mount the video camera inside the external bodywork of the vehicle and to protect it from external aggression by means of a protective window fixed to the bodywork.

Although the video camera is protected from external aggression, the video camera continues to be subject to the deposition of pollutants inside the bodywork of the vehicle and cleaning the video camera is particularly difficult in an arrangement of this kind.

It is known from the document WO2005039934 in the name of the applicant to mount a rear view video camera in a protective housing including a viewing window. This assembly further includes a device for spraying a cleaning liquid onto the viewing window. The video camera is therefore well protected at the same time as making it possible to provide an optimum view after cleaning.

However, this assembly proves too bulky and the video cameras currently available on the market are sealed with the result that it is preferred to mount them directly on a bodywork element at the level of the bumper or the number plate.

A new concept that has appeared since then tends not to clean the video camera as soon as it is dirty to maintain its operability but to keep it permanently clean against projections of rain or dust. To this end it is known to project continuously a curtain of air in front of the video camera producing a screen that prevents the deposition of dirt.

However, to allow the rear camera a very wide view, the latter is equipped with a wide-angle optic with a highly curved convex lens also known as a fish-eye lens. The image is then distorted by computer means so that the user can see a flattened image on a screen. The consequence of this curved fish-eye optic, when it is swept by a curtain of air substantially perpendicular to the optical axis, is that the proximal part of the air projection nozzle is well cleaned but the distal part, although protected by the curtain of air, forms a zone that is difficult to dry or to de-ice by means of the air curtain.

To solve this problem, there is known from the document JP 2012-201122 a video camera that includes a nozzle for projecting compressed air onto the lens surface from a portion of the external circumference of the convex lens.

Moreover, the video camera housing has a branching flow passage provided at a position below the convex lens, in the downstream direction of the compressed air, which makes it possible to redirect a small part of the projected air curtain toward the distal part of the lens.

However, given the size of this passage and of the head loss that it constitutes, this arrangement proves relatively ineffective, in particular when the vehicle is moving at 90 km/h, for example, and the air curtain is drawn toward the rear of the vehicle by aerodynamic phenomena around the vehicle.

Another solution that appears to be more effective is known from the document WO03104052, notably as shown in FIG. 3 of that document. In this case, a compressed air pump is installed in the vicinity of the video camera. An outlet of this pump is connected to a nozzle for projecting a jet of air onto one side of the lens of the video camera and a suction pipe that is connected via a filter for protecting the pump is placed on the side of the lens of the video camera opposite the projection nozzle.

This assembly is complex and costly. In fact, it necessitates the installation of a filter in the suction pipe so as to be able to protect the pump, which filter must be changed at regular intervals to maintain the operability of the device. In fact, once the filter is clogged, the pump runs dry and there is a reduced or even no flow of projected air.

Moreover, because the pump must be connected both to the projection nozzle and to the suction pipe, the pump and the filter must be installed in the vicinity of the video camera, which is generally difficult given the small amount of room that is available at the level of the bumper or at the level of the number plate.

Finally, in rainy weather, the air recirculated in a closed loop is very moist and there is a risk of mist being deposited on the optic of the video camera. No drying is possible. This cannot be counteracted by providing a costly dehumidifier in the suction or discharge pipes.

The present invention proposes to remedy at least in part the disadvantages mentioned above by providing a device for protection of an optical sensor that is easy to install and of relatively low cost and requires less maintenance.

To this end, the invention consists in a device for protection of an optical sensor, comprising:
  at least one nozzle for projection of air in front of the optical sensor, the projection nozzle being disposed on one side of the optical sensor and connected to an air discharge pump via a discharge pipe so that the air projected by the air projection nozzle flows over the surface of the optical sensor, and
  at least one suction pipe disposed on the opposite side of the optical sensor relative to the projection nozzle,
characterized in that the suction pipe is connected to the discharge pipe of the pump downstream of the pump so that the suction in the suction pipe is produced by a Venturi effect.

The air curtain is therefore effectively conveyed around the optical sensor, protecting it. The pump can even be installed at a great distance from the video camera given that the suction pipe works on the principle of a Venturi effect. This suction pipe requires no maintenance and in particular it is not necessary to install a filter in it. Moreover, the device according to the invention is less costly than the prior art solutions.

The protection device according to the invention may also have one or more of the following features separately or in combination:

The suction pipe may be connected to the discharge pipe so that the direction of the flow in the discharge pipe and the direction of the flow in the suction pipe make an angle less than or equal to 90°.

According to one aspect, the device includes a Venturi effect ejector at the level of the connection of the suction pipe to the discharge pipe.

For example, the Venturi effect ejector includes a constriction of smaller diameter than the discharge pipe.

The diameter of the constriction may be between 0.1 and 0.9 times inclusive the diameter of the discharge pipe.

According to a further aspect, the diameter of the suction pipe is less than the diameter of the discharge pipe and the diameter of the suction pipe is notably between 0.1 and 0.9 times inclusive the diameter of the discharge pipe.

The device may include a heating element disposed between the pump and the connection between the discharge pipe and the suction pipe.

For example, the flow of air at the outlet of the projection nozzle is a laminar flow of air.

According to a further aspect, the air discharge pump includes an air intake inside the passenger compartment of a motor vehicle.

The suction pipe may include an opening in the bottom part primarily to evacuate residues of water that may stagnate.

The invention also concerns a rear view system for motor vehicles including an optical sensor and a device as defined above.

Other advantages and features will become apparent on reading the description of the invention and from the appended drawings, in which.

In these figures, identical elements carry the same reference numbers.

Figure 1:
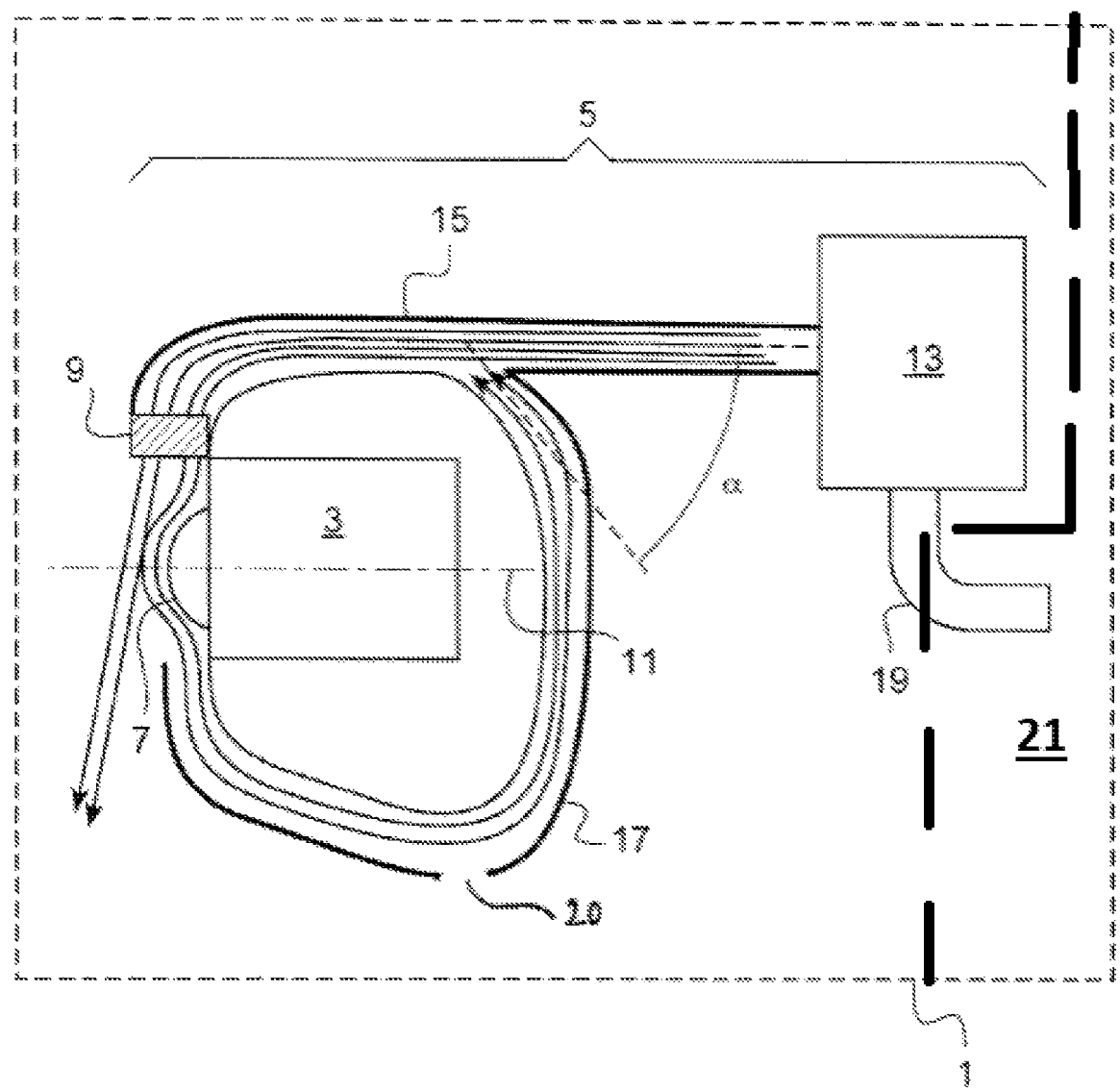
FIG. 1 is a diagram showing a first embodiment of the device according to the invention.

FIG. 1 shows a rear view system 1 for motor vehicles including an optical sensor 3 and a device 5 for protection of that sensor 3.

The optical sensor 3 is for example a video camera intended to be mounted at the rear of a motor vehicle, for example at the level of a bumper or a number plate (not shown).

The optical sensor 3 includes for example a convex (curved) optic 7 such as a fish-eye optic.

As seen in FIG. 1, the protection device 5 includes at least one air projection nozzle 9 disposed in front of the optical sensor 3.

In FIG. 1, the flow of air is directed substantially perpendicularly to the optical axis 11 of the optical sensor 3. In the present example, the flow of air is directed downward, toward the ground (not shown), but a possible alternative is for a flow of air to be directed from right to left or vice versa.

The projection nozzle 9 is therefore disposed on one side of the optical sensor 3 so that the projected air flows over the surface of the optical sensor 3, in particular its convex optic 7.

The projection nozzle 9 is fed with air by an air discharge pump 13 and is connected to an air outlet of the latter via a discharge pipe 15.

The discharge pump 13 is for example an air pulser, notably with a centrifugal or axial impeller, or a compressor. In the context of a heavy goods vehicle, the pump may be the compressed air compressor of the braking system of the vehicle with its compressed air reservoir.

The protection device 5 further includes at least one suction pipe 17 that is disposed on the side of the optical sensor 3 opposite the projection nozzle 9.

As seen in the figure, the suction pipe 17 is connected to the discharge pipe 15 of the pump 13 downstream of the latter so that the suction in the suction pipe 17 is produced by a Venturi effect.

It is therefore seen that some of the air that has been projected by the nozzle 9 is aspirated by the suction pipe 17 so that a kind of protective screen is formed by the flow of air around the convex optic 7 of the sensor 3.

Because the suction in the pipe 17 is produced by a Venturi effect, this pipe 17 can be relatively short and connected to the discharge pipe 15 in the vicinity of the optical sensor 3.

Because the pipe 17 functions on the basis of the Venturi effect, no particular maintenance is necessary and the discharge pump 13 can be disposed farther away, for example inside the passenger compartment 21. To this end, the air discharge pump includes an air intake 19 inside the passenger compartment 21 of a motor vehicle 100. The air blown in the direction of the optical sensor is therefore already filtered and conditioned, notably in terms of its temperature and relative humidity, by the air-conditioning system of the vehicle 100.

To form a kind of air curtain providing a screen against dirt, the flow of air at the outlet of the projection nozzle 9 is a laminar flow of air.

Where the connection of the suction pipe 17 to the discharge pipe 15 is concerned, the direction of the flow in the discharge pipe 15 and the direction of the flow in the suction pipe 17 make an angle $\alpha$ less than or equal to 90°.

Moreover, the diameter of the suction pipe 17 is less than the diameter of the discharge pipe 15, and in particular the diameter of the suction pipe 17 is between 0.1 and 0.9 times inclusive the diameter of the discharge pipe 15.

As can be seen in FIG. 1, the suction pipe 17 includes an opening 20 preferably disposed in the bottom part of the suction pipe. The purpose of this opening 20 is to prevent water or dirt stagnating in the suction pipe 17 and consequently blocking it.

Figure 2:
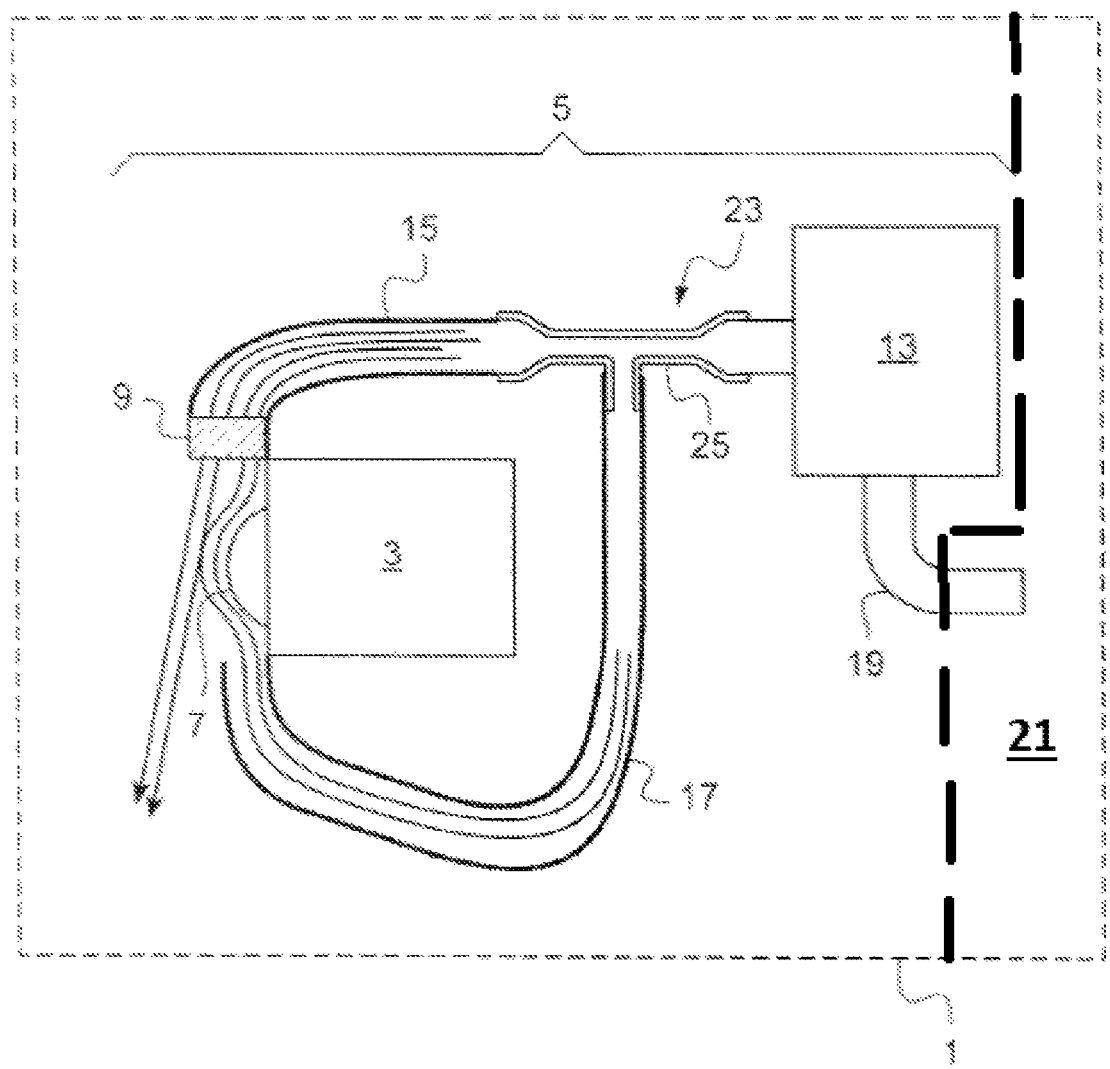
FIG. 2 is a diagram showing a second embodiment of the device according to the invention.

FIG. 2 shows another embodiment that differs from that from FIG. 1 in that the device includes a Venturi effect ejector 23 at the level of the connection of the suction pipe 17 to the discharge pipe 15.

The Venturi effect ejector 23 includes a constriction 25 of smaller diameter than the discharge pipe 15, for example a diameter between 0.1 and 0.9 times inclusive the diameter of the discharge pipe 15.

The effect of this is to strengthen the suction and to render the device more effective.

Figure 3:
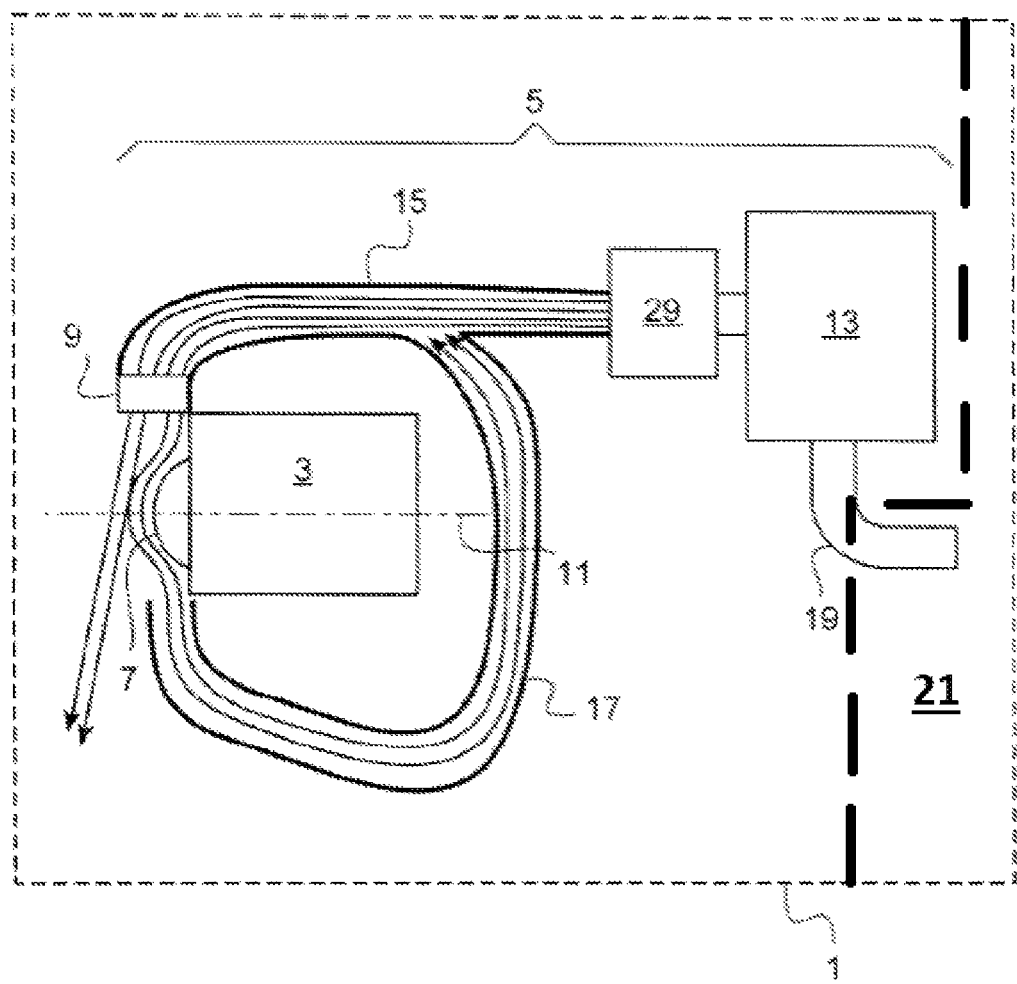
FIG. 3 is a diagram showing a third embodiment of the device according to the invention.

FIG. 3 shows a further embodiment that differs from that from FIG. 1 in that the device includes a heating element 29 disposed between the pump 13 and the connection between the discharge pipe 15 and the suction pipe 17. The heating element 29 may be an electrical heating element, for example, or a PTC (for example ceramic or plastic) component.

This embodiment is particularly beneficial for achieving rapid de-icing or drying of the convex optic 7 of the sensor 3.

It is therefore clear that the protection device 5 according to the invention provides a simple way to produce an effective protective air screen around the optical sensor 3.

Of course, other variants are possible without departing from the scope of the present invention. Thus the embodiments of FIG. 2 and FIG. 3 may be combined, for example.

Figure 4:
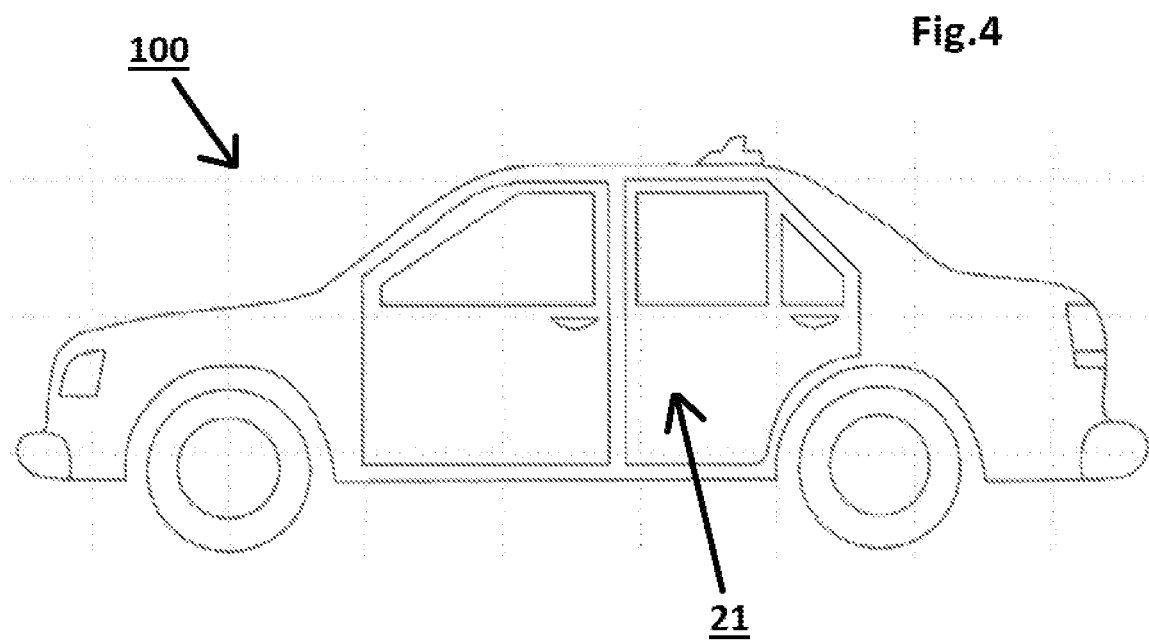
FIG. 4 is a diagram showing an example of a motor vehicle with a passenger compartment.

FIG. 4 shows an example of a motor vehicle 100 with a passenger compartment 21. The air intake 19 is disposed inside the passenger compartment 21 as shown in the embodiments of FIG. 1, FIG. 2, and FIG. 3.

The invention claimed is:

1. A device for protection of an optical sensor, comprising:
   at least one air projection nozzle for projection of air in front of the optical sensor, the air projection nozzle being disposed on one side of the optical sensor and connected to an air discharge pump via a discharge pipe so that the air projected by the air projection nozzle flows over a surface of the optical sensor; and
   at least one suction pipe disposed on the opposite side of the optical sensor relative to the air projection nozzle,
   wherein an outlet of the suction pipe is connected to the discharge pipe of the pump downstream of the pump and upstream of the air projection nozzle so that the suction in the suction pipe is produced by a Venturi effect, and
   wherein air sucked through the suction pipe exits from the outlet of the suction pipe.

2. The device as claimed in claim 1, wherein the suction pipe is connected to the discharge pipe so that the direction of the flow in the discharge pipe and the direction of the flow in the suction pipe make an angle less than or equal to 90°.

3. The device as claimed in claim 1, further comprising a Venturi effect ejector at a level of the connection of the suction pipe to the discharge pipe.

4. The device as claimed in claim 3, wherein the Venturi effect ejector includes a constriction of smaller diameter than the discharge pipe.

5. The device as claimed in claim 4, wherein the diameter of the construction is between 0.1 and 0.9 times inclusive the diameter of the discharge pipe.

6. The device as claimed in claim 1, wherein the diameter of the suction pipe is less than the diameter of the discharge pipe.

7. The device as claimed in claim 6, wherein the diameter of the suction pipe is between 0.1 and 0.9 times inclusive the diameter of the discharge pipe.

8. The device as claimed in claim 1, further comprising a heating element disposed between the pump and the connection between the discharge pipe and the suction pipe.

9. The device as claimed in claim 1, wherein the suction pipe includes an opening in the bottom part.

10. The device as claimed in claim 1, wherein the flow of air at the outlet of the air projection nozzle is a laminar flow of air.

11. The device as claimed in claim 1, wherein the air discharge pump includes an air intake inside the passenger compartment of a motor vehicle.

12. A rear view system for a motor vehicle, comprising: an optical sensor; and a device as claimed in claim 1.

* * * * *